United States Patent [19]

Kindl

[11] Patent Number: 5,533,873
[45] Date of Patent: Jul. 9, 1996

[54] INDUCTION REGULATOR VALVE FOR ROTARY COMPRESSORS

[75] Inventor: Gerhard Kindl, Vienna, Australia

[73] Assignee: Hoerbiger Ventilwerke Aktiengesellschaft, Vienna, Austria

[21] Appl. No.: 508,891

[22] Filed: Jul. 28, 1995

[30] Foreign Application Priority Data

Jul. 29, 1994 [AU] Australia .................. A-1506.94

[51] Int. Cl.$^6$ .................................................. F04B 49/00
[52] U.S. Cl. ............... 417/295; 417/298; 418/201.2; 137/529
[58] Field of Search ....................... 417/295, 298, 417/441; 137/529; 418/201.2

[56] References Cited

U.S. PATENT DOCUMENTS

| | | | |
|---|---|---|---|
| 3,862,751 | 1/1975 | Schwaller | 137/529 |
| 4,064,906 | 12/1977 | Berg | 137/529 |
| 4,147,475 | 4/1979 | Shoop et al. | 418/201.2 |
| 5,018,947 | 5/1991 | Tsuboi | 418/201.2 |
| 5,174,332 | 12/1992 | Yokoyama et al. | 137/529 |
| 5,411,375 | 5/1995 | Bauer | 417/295 |

FOREIGN PATENT DOCUMENTS 5039791  2/1993  Japan ............... 418/201.2

Primary Examiner—Charles Freay
Attorney, Agent, or Firm—Watson Cole Stevens Davis

[57] ABSTRACT

An induction regulator valve is incorporated in the induction manifold of a compressor to provide for infinitely variable regulation of the output from the rotary type compressor, in particular the screw-type compressor. The closing piece of the induction regulator valve can be adjusted by means of an actuator system. To improve this regulation performance of this system, in particular to reduce its sensitivity when the regulator valve is almost closed, the spring system is formed so that its stiffness varies along the length of its spring path, the stiffness of the spring system being smaller when the induction regulator valve is open than when it approaches the closed position of the closing piece of the induction regulator valve.

12 Claims, 3 Drawing Sheets

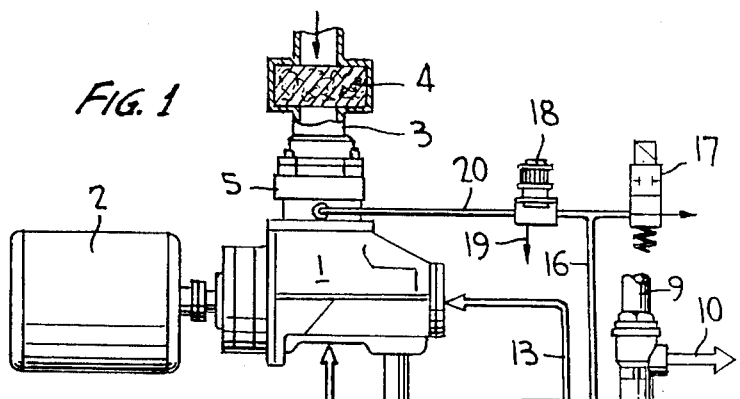
FIG. 1
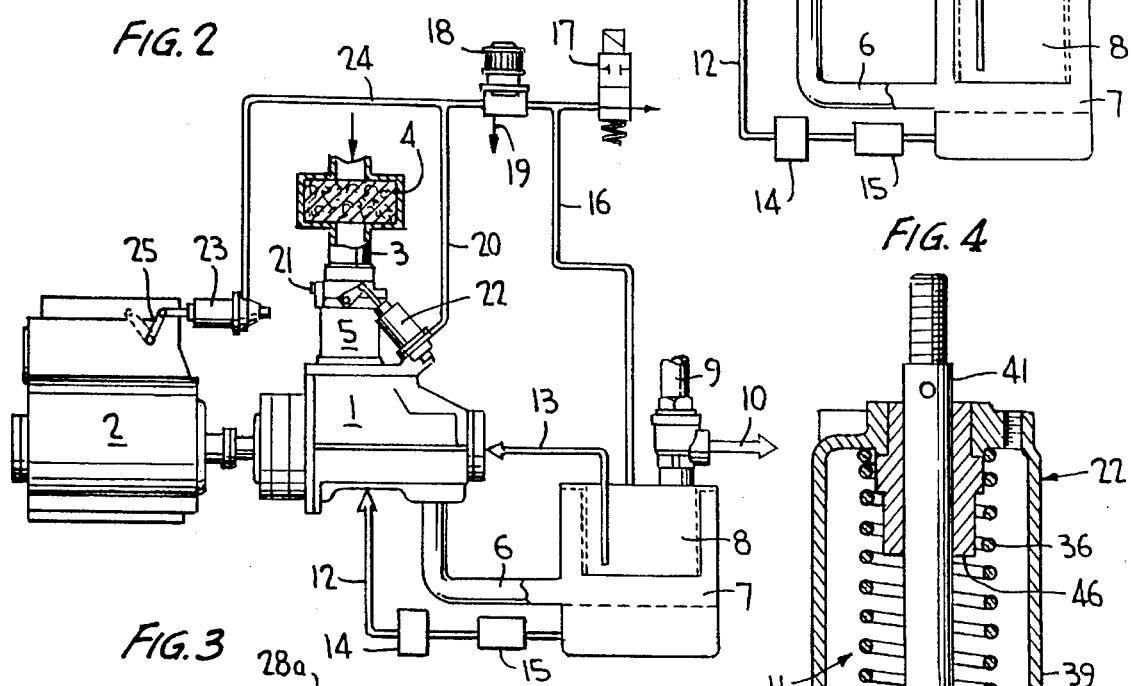
FIG. 2
FIG. 4
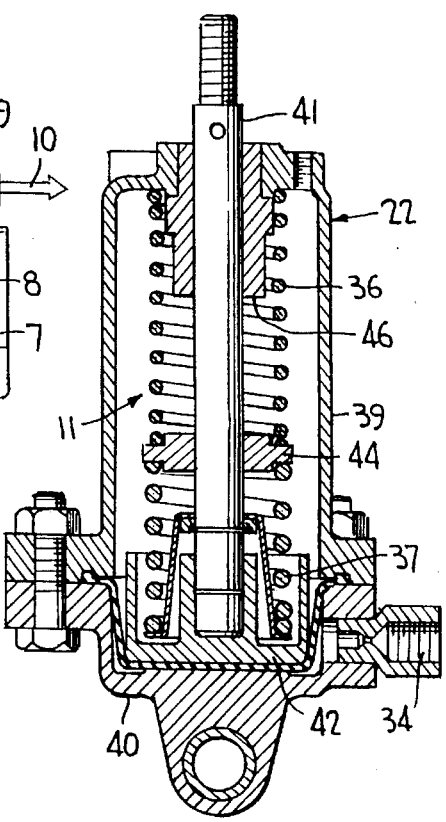
FIG. 3
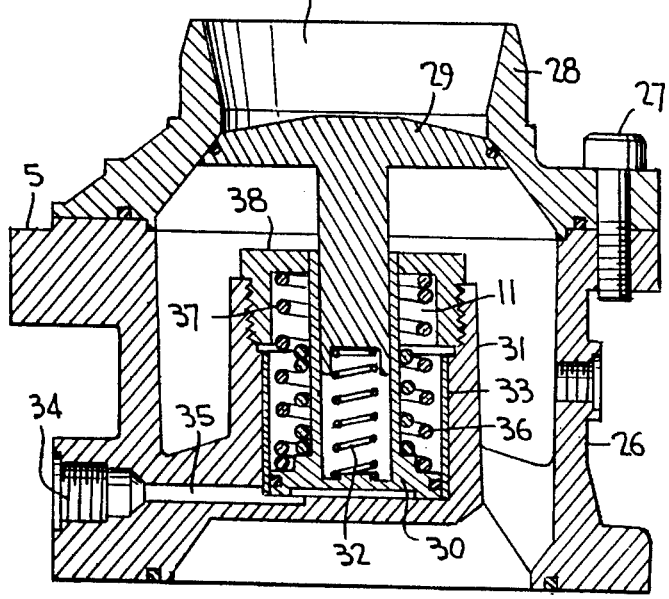

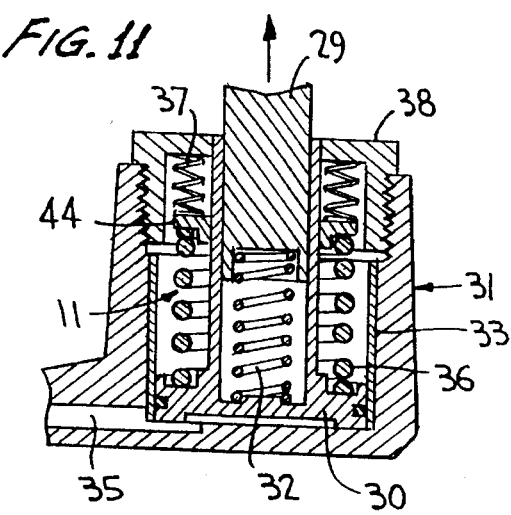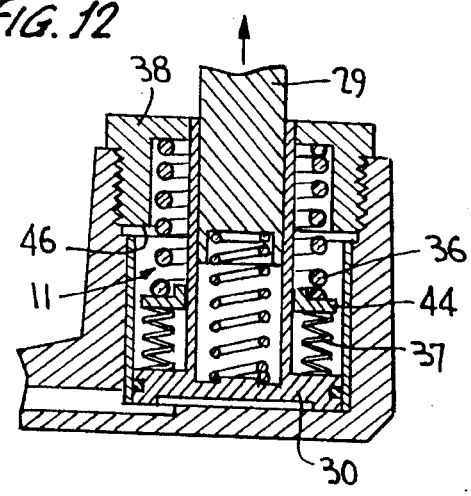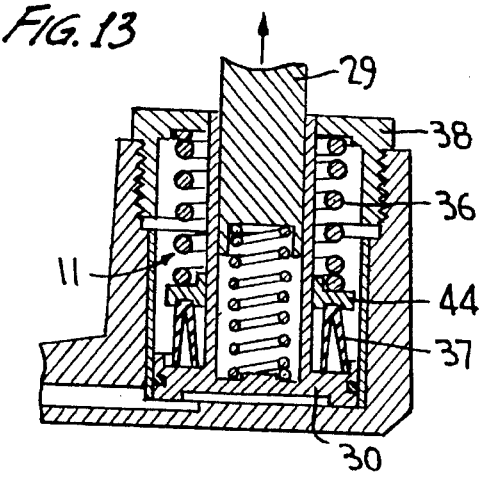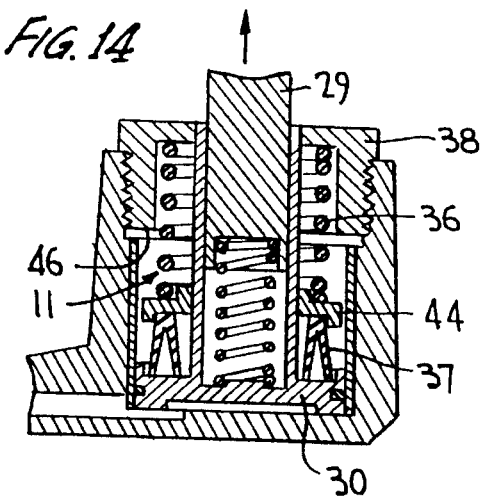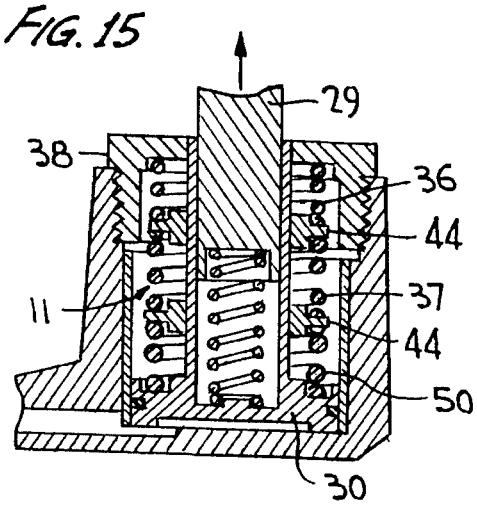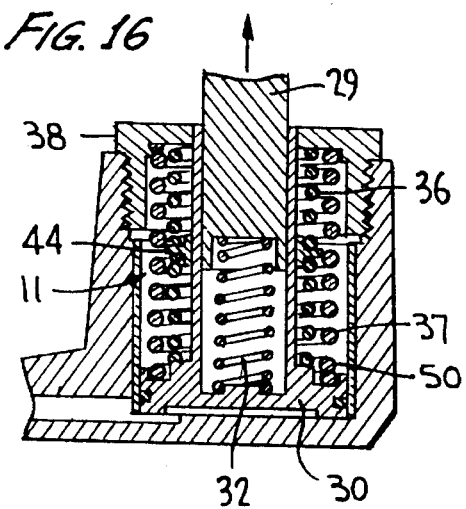

INDUCTION REGULATOR VALVE FOR ROTARY COMPRESSORS

BACKGROUND OF THE INVENTION

The present invention relates to an induction regulator valve for rotary compressors, in particular for screw-type compressors.

The valve is installed in the induction manifold of the compressor and can be operated by a pneumatic actuator, the adjusting body of which, for example, pistons or diaphragms, that is acted upon by a pressurized medium, adjusts the closing piece of the induction regulator valve against a spring system that acts on the closing piece of the induction regulating valve or on the adjusting body of the actuator system.

It is known that the delivery capacity of compressors, particularly of rotary compressors, such as screw-type compressors or the like, can be regulated by changing the throughput cross section of the induction manifold, that is to say that the quantity of medium that is brought in is throttled to a greater or lesser degree. This throttling effect is achieved with the help of an induction regulator valve of the type described in the introduction hereto. This is incorporated into the induction manifold of the rotary compressor, held in the open position by a spring system, and adjusted in the closing direction by means of the actuator, which as a rule is acted upon by compressed medium from the regulated compressor itself.

Using this relatively simple arrangement, it is possible to regulate the output from a rotary compressor across the whole delivery range, so that for all practical purposes it is infinitely variable, and can be matched to a particular requirement. In practice, however, it has been shown that only relatively precise regulation is possible using this known arrangement and, in particular in the event of pronounced throttling of the induction manifold, regulation becomes relatively unstable, particularly if the cross section of the induction regulator valve is so selected that in the wide-open position, there is a small valve loss.

It has been shown that, starting from an open induction regulator valve, this can be closed to more than 80 percent of its stroke without initiating a throttling effect of anything like a corresponding order of magnitude. Only relatively small adjusting forces are required in this range, and regulation is relatively insensitive and stable. However, as the induction regulator valve approaches the closed position, even a relatively small change in its stroke will induce a relatively large change in the throttling effect. Thus, regulation becomes ever more sensitive and unstable as the closed position of the induction regulator is approached. Even small changes in the adjusting pressure acting on the actuator lead to a relatively large change in the throttling effect.

It is an object of the present invention to improve infinitely variable regulation using an induction regulator valve. In particular, it is intended to provide more stable regulation for the same regulation variation or smaller variations of regulation with adequate stability and to provide more precise regulation overall.

SUMMARY OF THE INVENTION

According to the present invention the spring system provides for varying degrees of stiffness over its spring travel, the stiffness of the spring being less when the induction regulator valve is open than it is when the closing piece of the induction regulator valve is nearly in the closed position.

Surprising results are achieved by modifying or supplementing the spring system in this manner. Starting with an open induction regulator valve, the spring stiffness is slight. Accordingly, only a small change of the adjusting pressure is required to achieve a relatively large adjustment of the closing piece in the range in which regulation is insensitive. This results from the type of valve and is also a consequence of the dimensioning of the valve cross section for a small valve loss when the valve is fully open. In contrast to this, in the vicinity of the closed position of the induction regulator valve, spring stiffness is considerably greater, with the result that in this range the sensitivity of the regulation is reduced and as a consequence it is correspondingly more stable. Because of the relatively great spring stiffness, a correspondingly large change in adjusting pressure is required in order to achieve a relatively small adjustment of the closing piece of the induction regulator valve and thus of the throttling effect that is achieved. For this reason, regulation with the induction regulator valve according to the present invention is distinguished by great stability across the whole range of regulation, so that better regulation is achieved than is the case with conventional induction regulator valves.

The present invention can be used both for seat-type valves that are used as induction regulator valves and for butterfly valves or slides. The present invention is independent of the type of induction regulator valve itself. All that is important is that the closing piece of the induction regulator valve be adjusted against the force of a spring system and the stiffness of this spring system be considerably greater in the vicinity of the closed position of the induction regulator than it is in the vicinity of the open position of said valve.

A number of different embodiments of the spring system according to the present invention are possible within the context of the invention. The spring system can consist of at least one coil spring in which the pitch of the spring coils differs along the length of the spring. When the spring is compressed, essentially it is first the spring coils with the least pitch that are effective and on further compression of the spring these lie against each other. The stiffness of the spring becomes similarly greater because of the greater pitch of the remaining coils.

In another embodiment of the present invention, the spring system consists of at least one coil spring, the coils of which are of different diameter or cross section. In this case, the first to become effective are the coils with the greatest spring diameter and/or the smallest cross-section because the stiffness of these coils is relatively slight. Greater stiffness is achieved with small coil diameters and/or a greater cross section of the wire forming the spring.

The spring system can also consist of a disk or plate-type spring that has a progressive spring rate. It is also possible to use a disk or plate-type spring that does not have a progressive spring rate, when this is then supported on a spring collar having at least one stop that projects against it. On compression, the disk spring lies progressively against the stop from the outside toward the inside. Whereupon the effective spring length is reduced and the stiffness of the spring is thus increased progressively.

In another embodiment, the spring system consists of at least one spring that is manufactured from an elastomer, e.g., rubber, this spring having a progressive spring rate.

A progressive spring rate for the spring can also be achieved if the spring system consists of a coil spring that has a section of its length inserted into a helical channel in a supporting element, which bridges some of the coils of the spring when the spring is compressed. The coils of the spring that are arranged within the channel of the supporting element lie against the supporting element and are non-effective, which means that the stiffness of the spring as a whole is increased.

In an advantageous embodiment of the present invention, the spring system consists of at least two springs of different stiffness. These are arranged coaxially above one another and are connected to each other by friction, for example, through an interposed spring collar. Also in this embodiment, starting with the regulator valve open, it is initially the spring with the least stiffness that becomes effective, whereas the spring having greater stiffness first becomes effective in the vicinity of the closed position of the induction regulator valve, or when this induction regulator valve is almost closed.

Another embodiment of the spring system consists of at least two springs of different stiffness that are arranged coaxially one above the other and joined together by friction through a spring collar such that an end stop for at least one spring collar is provided on the housing of the actuator. The particular spring that is supported on this spring collar then remains effective until such time as the spring collar comes to rest against its end stop. Then, a spring that is of greater stiffness becomes effective.

In a preferred embodiment of the present invention, provision is made such that the spring system consists of at least two springs of different diameter, these springs, which are of different lengths, being arranged coaxially one above the other and joined together by friction through a spring collar. The spring with the least stiffness is best configured so as to be longer, in contrast to which the spring that is of greater stiffness is relatively short. When the springs are compressed, which is to say as the induction regulator valve closes progressively, initially it is only the spring with the lesser stiffness that is effective. Only in the vicinity of the closed position of the regulator valve does the shorter and stiffer spring come into contact with the housing of the actuator, so that on further adjustment both springs are compressed and the spring stiffness of the spring system becomes correspondingly greater.

The springs of this spring system that are arranged coaxially one inside another can be of identical stiffness, when the different stiffness of the spring system itself, taken as a whole, is achieved in that a different member of springs becomes effective. The springs of the spring system can, however, be of different stiffness. The spring system according to the present invention can thus be manufactured with any desired characteristics in a very simple manner.

Finally, another embodiment of the present invention is such that the springing consists of at least two springs of different diameter, these being arranged concentrically one inside the other, and in that for at least one of these springs there is a stop that supports the end of the spring that is initially unattached. Also, in this embodiment, the stiffness of the spring system as a whole becomes correspondingly greater when the unattached end of the spring comes into contact with the stop that is provided.

BRIEF DESCRIPTION OF THE DRAWINGS

The invention will now be described in more detail, by way of example only, with reference to the accompanying drawings, in which:

FIGS. 1 and 2 are diagrams showing a compressor system incorporating an induction regulator valve according to the present invention;

FIG. 3 is an axial cross-sectional view taken through one embodiment of the regulator valve with the actuator;

FIG. 4 is an axial mid-line sectional view taken through another embodiment of the actuator without the valve; and FIGS. 5 to 16 are axial line sectional view taken through different embodiments of the actuator, these being shown in some cases with the valve omitted.

DESCRIPTION OF THE PREFERRED EMBODIMENTS

Figure 5:
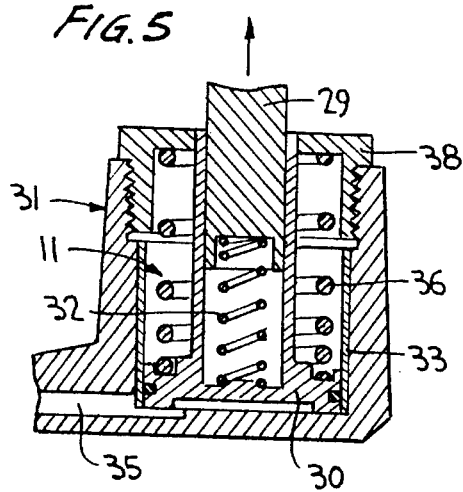
Figure 6:
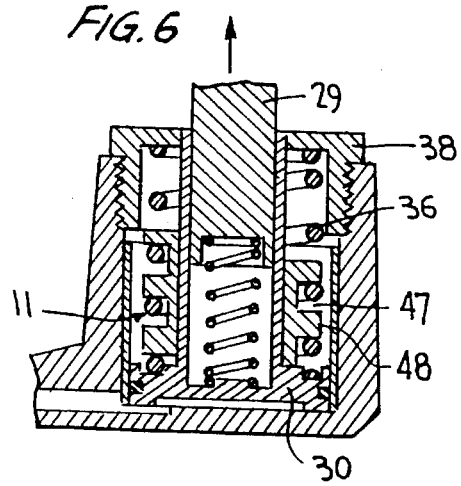

The compressor systems that are shown in FIG. 1 and FIG. 2 consist in each instance of a screw-type compressor 1 that is driven by a motor 2. In the embodiment that is shown in FIG. 1 this is an electric motor, and in the embodiment that is shown in FIG. 2, it is a diesel engine. In each instance, the motor 2 is indicated only diagrammatically; the power supply to the electric motor and the fuel system and all auxilliary systems for the diesel engine having been omitted.

In both embodiments, the compressor has an induction manifold 3 with an incorporated filter 4. In addition, an induction regulator valve 5, shown diagrammatically in FIGS. 1 and 2 is incorporated in the induction manifold. A pressure line 6 leads from the screw-type compressors 1 to a pressure accumulator 7 formed as an oil separator, and a fine separator 8 is arranged in the lower part thereof. A supply line 10 leads therefrom through a minimum pressure valve 9 to a consumer, for example a compressed air system, not shown.

The minimum pressure valve 9 shown has a non-return valve that closes when the pressure is released from the pressure accumulator 7, thereby preventing simultaneous release of pressure at the consumer. The minimum pressure valve 9 also closes if the pressure at the consumer falls below a minimum value so as to prevent too rapid a pressure drop in the pressure accumulator 7, which would endanger the lubrication and cooling of the compressor 1. Thus, the minimum pressure valve 9 ensures that the pressurized medium is always at adequate pressure, so as to ensure that liquid is supplied from the pressure accumulator 7 to the screw-type compressor 1. To this end, a fluid line 12 leads from the lower part of the pressure accumulator 7 to the screw-type compressor 1. The fluid that is delivered through the lines 12, 13 serves to seal, cool, and lubricate the screw-type compressor. A filter 14 and a cooler 15 are incorporated in the fluid line 12. The relatively small quantity of fluid that collects in the fine separator 8 is returned to screw-type compressor 1 via a further fluid line 13.

The arrangements according to FIGS. 1 and 2 also include a control line 16 leading from the pressure accumulator 7 and branching to power a solenoid valve 17 and a proportional regulator 18. The solenoid valve 17 is configured as an idling- and ventilating valve. The proportional regulator 18 is adjustable and regulates the pressure within the pressure accumulator 7. As the compressor pressure rises, the proportional regulator 18 opens and the pressure in the control line that leads to the induction regulator valve 5 rises. When the compressor pressure falls, the proportional regulator 18 closes and the pressure in the control line 20 is reduced by being blown off through an exhaust nozzle 19. The pressurized medium that is supplied to the induction regulator valve 5 through a further control line 20 operates the actuator of the induction regulator valve 5 and thus regulates the quantity supplied to the screw-type compressors 1 according to the pressure that had been set at the proportional regulator 18.

In the embodiment that is shown in FIG. 2, the induction regulator valve 5 is in the form of a butterfly-type control valve that is adjusted by means of a lever-type control 21, and an actuator 22 that is similarly shown only in diagrammatic form is provided for this purpose. A further actuator 23, supplied by way of a control line 24, controls the injection pump (not shown) of the drive motor 2, which in this example is a diesel engine.

FIG. 3 shows an induction regulator valve 5 of the kind used in the compressor system shown in FIG. 1. This valve comprises a housing 26 having a cover 28 secured thereto by the flange bolts 27 and through which the suction line 28a passes; this simultaneously forms the valve seat for the closing piece 29 of the induction regulator valve 5.

This closing piece 29 is supported in the hollow adjusting body 30 of an actuator 31, against the force of a weak spring 32. The adjusting body 30 is configured as a piston and is sealed and guided within a cylinder 33. Pressurized medium can be supplied to adjust the adjusting body 30 formed as a piston through a connector bore, 34 from which a channel 35 leads into the cylinder 33. This adjusting body 30 is acted upon by a spring system 11, comprising two return springs 36 and 37 that are arranged concentrically around it.

The two return springs 36 and 37 that make up the spring system 11 of the actuator 31 are of almost equal cross sectional area and both have nearly identical pitch. The outer spring 36 is not as stiff as the inner spring 37. In addition, the return spring 36 extends to the whole stroke of the actuator, in contrast to which the inner return spring 37 is shorter.

FIG. 3 shows that the closing piece 29 holds the induction regulator valve 5 closed in the position shown. This applies to any position the induction regulator valve 5 is in when the compressor 1 is stationary. When this happens, the closing piece 29 held onto its seat by the weak spring 32 prevents compressed medium from flowing back from the pressure accumulator 7 into the suction line 28a when the compressor 1 is not operating. As soon as the compressor 1 begins to run, however, the suction overcomes the force of the weak spring 32, whereupon the adjusting body 29 opens the induction regulator valve 5.

In order to close the induction regulator valve 5 either completely or partially when the compressor is operating, and thereby throttle the induction of medium in order to regulate the output, medium that is under pressure is supplied through the connector 34 and the channel 35. This acts upon the adjusting body formed as a piston, and moves this against the force of the spring system 11, initially upwards against the force of the return spring 36, when it then moves the closing piece 29 in the direction of its seat. Since the second return spring 37 is not initially under load, movement of the adjusting body 30 requires only a relatively low medium pressure. However, as soon as the second return spring 37 comes into contact with the upper end of the cover 38 of the actuator 31, it becomes effective, whereupon it increases the stiffness of the spring system 11 correspondingly. For this reason, considerably greater pressure of the pressurized medium is required to move the closing piece 29 further in the vicinity of its closed position, and this means that regulation is correspondingly more stable and precise so that, overall, improved regulation performance is achieved.

The actuator 22 used to adjust the regulator butterfly valve (not shown) in the FIG. 2 embodiment is shown in FIG. 4. This has a cylinder housing 39 with a rolled diaphragm 40 within it; this moves the butterfly valve of the regulator valve 5 a rod 41 that passes out at the upper end via the link 21. In this embodiment, a pressurized-medium connector 34 is also provided to move the rolled diaphragm 40.

The rolled diaphragm 40 lies on a spring collar 42 connected to the rod 41 and supports the spring system 11. This spring system 11 consists of two return strings 36 and 37 that are arranged coaxially above each other with a disk spring 44 therebetween. The springs 36, 37 are of identical diameter. The lower return spring 37 is, however, wound from much thicker wire than the return spring 36 that is located above it, and is thus considerably stiffer. When the rolled diaphragm 40 is acted upon by pressurized medium through the connector 34 it first compresses the weaker return spring 36, until the spring collar 44 comes into contact with a stop 46 that is located above it, concentrically around the rod 41. Then, the stiffer return spring 37 becomes effective, so that from this moment on, exactly as in the embodiment shown in FIG. 3, control becomes less sensitive but, at same time, more stable. This arrangement is used to achieve more precise and improved regulation.

FIGS. 5 to 16 show several embodiments of spring systems 11 that can be used in the induction regulator valve according to the present invention, these springs being of different stiffness. Essentially, all of these embodiments correspond to the induction regulator valve 5 shown in FIG. 3, although in the embodiments only the actuator 31 with the spring system 11 is shown. Thus, in each embodiment, the actuator 31 has a cylinder 33 in which the adjusting body 30 is guided and sealed. The closing body 29, of which only its cylindrical guide piece is shown, can move in a hollow chamber of the adjusting body 30, against the force of a weak spring 32. The channel 35 for the delivery of pressurized medium to operate the adjusting body 13 opens out into the lower end of the cylinder 33; at its upper end, the cylinder 33 is closed off by a cover 38.

In the embodiment shown in FIG. 5, the spring system 11 consists of a single coil spring 36, and the pitch of the turns of this coil spring varies along the length of the spring 36. As the stroke of the spring increases, the turns of the spring lie progressively against each other, so that reduction of the spring turns makes the spring progressively stiffer.

In the embodiment that is shown in FIG. 6, there is, once again, only a single coil spring 36 as the spring system 11. Some of the spring turns, which are of identical pitch, lie in a helical channel 47 of a support 48 lying on an adjusting body 30 that can be moved against the spring system 11. In this embodiment, when the spring stroke increases, the turns that are located in the channel 47 of the support 48 lie sequentially on the support 48 and are thus rendered ineffective. When this happens, there is also an increase of the spring stiffness because of the reduction of effective turns.

Figure 7:
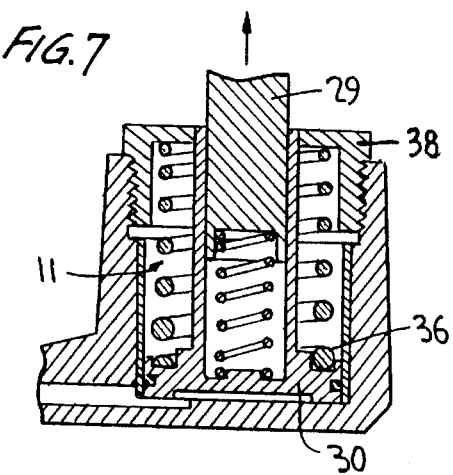

The FIG. 7 embodiment includes a single coil spring 36, the coils of which being of different cross-section. Thus, the first to become effective are the coils having the greatest spring diameter and/or the smallest cross-section given that the stiffness of such coils is relatively slight. Greater stiffness is effected with small coil diameters and/or a greater cross-section of the wire forming the spring.

Figure 8:
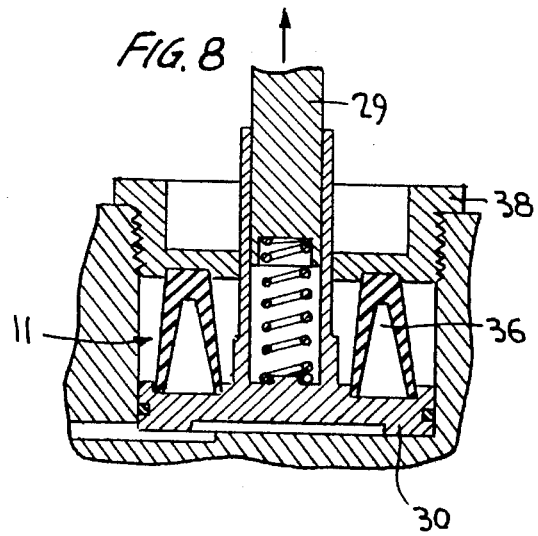

The spring system of FIG. 8 has a spring 36 comprised of an elastomeric material, such as rubber, to effect a progressive spring rate.

Figure 9:
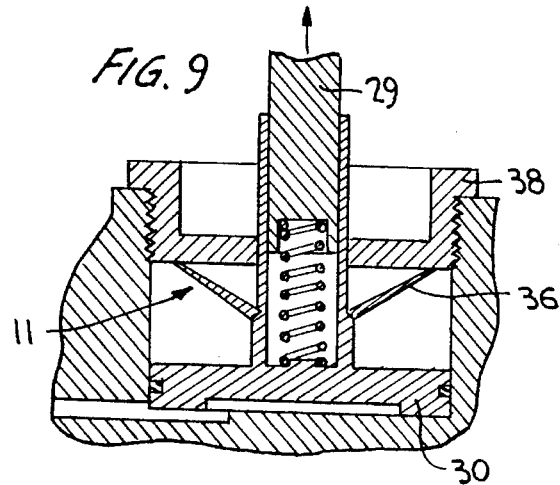

The spring 11 system of FIG. 9 comprises a conical disc spring 36 with a progressive spring rate.

Figure 10:
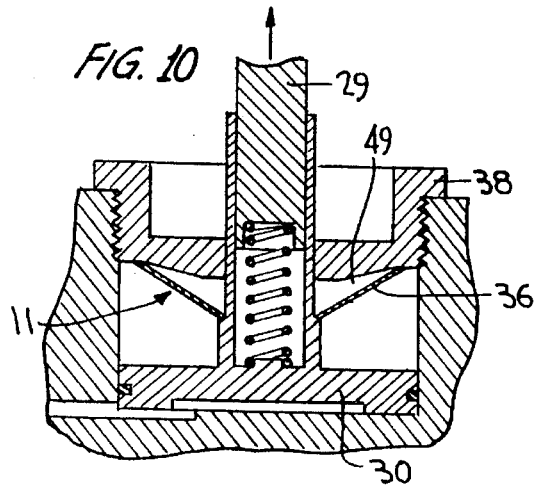

In FIG. 10, spring 11 comprises a conical disc spring 36 seated against a spring collar 38 having a disk shaped seating surface 49. Thus, with increasing spring lift, the cup spring seats progressively on surface 49, whereby the spring length is reduced and the spring rigidity is increased.

FIGS. 11 to 16 show embodiments in which a spring system 11 consisting of more than one spring is provided. In FIG. 11 a coil spring 36 is supported on the adjuster body 30 with a coaxial disk spring 37 of greater stiffness located thereabove. Between the two springs there is a spring collar 44. When this spring system 11 is compressed, the turns of the coil spring 37, which is not as stiff, first lie against each other. Then, the stiffer turns of the disk spring 27 become effective.

In the embodiment shown in FIG. 12, a coil spring 36 of lesser stiffness and a disk spring 37 of greater stiffness are arranged coaxially one above the other, with a spring collar 44 interposed therebetween. In addition, on the cover 38 of the actuator 31 there is a stop 46 for the spring collar 44. When this spring system 11 is placed under load, initially the coil spring 36 is compressed until the spring collar 44 comes into contact with the stop 46. When this happens, the stiffer disk spring 37 becomes effective, and this results in progressive springing.

For the most part, the embodiments that are shown in FIGS. 13 and 14 compare with those shown in FIGS. 11 and 12. The difference lies in the fact that instead of an elastomeric disk spring, a spring 37 having a progressive spring rate is used. In FIG. 13, the elastomeric spring 37 is coaxial with the coil spring 36, with the spring collar 44 interposed therebetween. FIG. 14 shows an identical arrangement, except that the cover 38 has a stop 46 for the spring collar 44. The manner in which this arrangement works is identical to that shown in the FIGS. 11 and 12 embodiments.

Finally, FIGS. 15 and 16 show two arrangements in which the spring system 11 consists, in each instance, of three springs. In FIG 15, three coil springs 36, 37, and 50 are arranged coaxially above each other with spring collars 44 and 44' interposed between them. The springs are made of spring wire of unequal cross section, so that they are all of different stiffness. When the spring system of FIG. 15 is compressed, the coils of the least stiff spring 36 first contact each other, whereupon the spring 37 becomes effective. When its turns contact each other, the spring 50 that has the greatest stiffness becomes effective. This results in a spring system 11 of progressive stiffness.

FIG. 16 also shows an arrangement with three springs. The stiffest spring 50 bridges the whole of the spring stroke of the spring system, whereas the two springs 36 and 37 that are not as stiff are arranged concentrically and coaxially above one another and inside the spring 50, with a spring collar 44 between them. It can be seen that the spring system that results from these three springs of unequal stiffness produces a progressive springing effect.

Numerous arrangements of springs that are arranged and combined differently are possible within the context of the present invention, in order to obtain the desired progressively effective spring system. In each case, it is possible, in a simple way, to satisfy all the demands made in practice by an appropriate combination of the individual springs. In all the embodiments, it is important that the spring system be of relatively slight stiffness initially, when the induction regulator valve be open, and that the stiffness of the spring system is relatively great when the induction regulator valve is almost closed. In this way, the sensitivity of induction regulation in the actual range of regulation, with the induction regulator valve almost closed, is reduced and this improves the precision of regulation as well as overall regulation performance.

The Embodients of the Invention in Which an Exclusive Property or Privilege is Claimed are Defined as Follows:

1. An induction regulator valve for installation in the induction manifold of a rotary compressor and operable by a pneumatic actuator, comprising:

a closure member for regulating fluid flow through the valve;

a displaceable adjusting member accommodating sad closure member and responsive to a pressurized medium to determine an operating position of the closure member that can lie between a closed position and an open position; and spring means operable to oppose the action of said pressurized medium on an adjusting member, said spring means having a varying stiffness that is less when the operating position of said closure member is closer to its open position than when said closure member is closer to its closed position.

2. An induction regulator valve as claimed in claim 1, wherein said spring means comprises at least one coil spring, the pitch of the turns of said spring varying along the length of the spring.

3. An induction regulator valve as claimed in claim 1, wherein said spring means comprises at least one coil spring, the turns of said spring being of different cross-section.

4. An induction regulator valve as claimed in claim 1, wherein said spring means comprises a disk spring having a progressive spring rate.

5. An induction regulator valve as claimed in claim 1, wherein said spring means comprises at least one spring having a progressing spring rate, said spring being made of an elastomer.

6. An induction regulator valve as claimed in claim 1, wherein said spring means comprises a coil spring, a part of the spring turns of which being located within a helical channel of a support for rendering said part of the spring turns ineffective when the spring is compressed.

7. An induction regulator valve as claimed in claim 1, wherein the spring system comprises at least two springs of different stiffness, and which are arranged coaxially one above the other and held together by friction.

8. An induction regulator valve as claimed in claim 7, wherein said at least two springs are held together by friction through an interposed spring collar.

9. An induction regulator valve as claimed in claim 1, wherein said spring means comprises at least two springs of different stiffness that are arranged coaxially one above the other and held together by friction by means of at least one disk spring, an end stop being provided on a housing of the pneumatic actuator for at least one said spring disk.

10. An induction regulator valve as claimed in claim 1, wherein the spring means comprises at least two springs of different diameter, said springs being arranged coaxially one inside the other and being of different lengths.

11. An induction regulator valve as claimed in claim 10, wherein said springs are of different stiffness.

12. An induction regulator valve as claimed in claim 1, wherein said spring means comprises at least two springs of different diameter, said springs being arranged concentrically inside each other, and a stop is provided for at least one of said springs, said stop initially supporting a free end of said one spring.

\* \* \* \* \*

UNITED STATES PATENT AND TRADEMARK OFFICE
CERTIFICATE OF CORRECTION

PATENT NO. : 5,533,873
DATED : July 9, 1996
INVENTOR(S) : Gerhard KINDL

It is certified that error appears in the above-indentified patent and that said Letters Patent is hereby corrected as shown below:

In the title page, under "Foreign Application Priority Data", delete "Australia" and insert --Austria--.

Signed and Sealed this

First Day of October, 1996

*Attest:*

BRUCE LEHMAN

*Attesting Officer*     *Commissioner of Patents and Trademarks*